(12) United States Patent
Hannula et al.

(10) Patent No.: US 11,008,911 B1
(45) Date of Patent: May 18, 2021

(54) SCRUBBER FOR EXHAUST GAS CLEANING

(71) Applicant: Valmet Technologies Oy, Espoo (FI)

(72) Inventors: Kalle Hannula, Vesilahti (FI); Heikki Airikkala, Akaa (FI); Jere Fabritius, Nokia (FI); Juha Ojanperä, Pirkkala (FI); Kari Mäkelä, Kangasala (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 17/122,276

(22) Filed: Dec. 15, 2020

(30) Foreign Application Priority Data

Dec. 20, 2019 (FI) .................................. 20196116

(51) Int. Cl.
*F01N 3/04* (2006.01)
*B01D 47/06* (2006.01)
*F01N 13/00* (2010.01)

(52) U.S. Cl.
CPC .............. *F01N 3/04* (2013.01); *B01D 47/06* (2013.01); *B01D 2252/1035* (2013.01);
(Continued)

(58) Field of Classification Search
CPC .......... F01N 3/04; F01N 3/043; F01N 13/004; F01N 2260/10; F01N 2590/02;
(Continued)

(56) References Cited

U.S. PATENT DOCUMENTS 999,332 A    8/1911 Mueller
5,944,361 A * 8/1999 Bravo ................... B65D 90/105
                                                141/311 A
(Continued)

FOREIGN PATENT DOCUMENTS

CN        105135108 A  * 12/2015  ............... C02F 9/005
DE    10 2008 022 390  * 11/2009  ........... F01N 13/185
(Continued)

OTHER PUBLICATIONS

Communication of Acceptance for Finnish Patent Application No. 20196116, dated Jun. 12, 2020, (25 pages), Finnish Patent and Registration Office, Helsinki, Finland.
(Continued)

*Primary Examiner* — Timothy C Vanoy
(74) *Attorney, Agent, or Firm* — Alston & Bird LLP

(57) ABSTRACT

A scrubber for exhaust gas cleaning onboard a marine vessel, comprising a scrubber shell (12) forming a scrubber chamber; and a tubular pipe (18) running through the scrubber shell for feeding scrubber liquid into the scrubber chamber; a concave bowl (32) for connecting the tubular pipe to the scrubber shell, the concave bowl having the shape of a solid of revolution, and the shape curving smoothly from the rim (46) of the concave bowl to the bottom (48) of the concave bowl. The tubular pipe runs through the bottom of the concave bowl in such a way that the bottom encircles the tubular pipe, and the tubular pipe and the bottom are connected to each other. The concave bowl is placed in an opening (34) in the scrubber shell in such a way that the scrubber shell encircles the rim of the concave bowl, and the scrubber shell and the rim are connected to each other.

20 Claims, 3 Drawing Sheets

(52) U.S. Cl.
CPC ........ *F01N 13/004* (2013.01); *F01N 2570/04* (2013.01); *F01N 2590/02* (2013.01)

(58) Field of Classification Search
CPC ... F01N 2570/04; B01D 47/06; B01D 53/504; B01D 53/78; B01D 2221/08; B01D 2257/302; B01D 2258/012; B01D 2258/0283; B01D 2259/4566; F23J 13/04; F16L 13/04; F16L 23/026; F16L 23/0283; F16L 23/032; F16L 23/24; F16L 25/00; F16L 41/021; F16L 41/08; F16L 49/04; F16L 51/00; F16L 58/188
See application file for complete search history.

(56) References Cited

U.S. PATENT DOCUMENTS

2006/0061102 A1* 3/2006 Wilkinson, III ...... F16L 39/005
285/412

2011/0088834 A1* 4/2011 Miyamoto .............. F16L 23/24
156/191
2015/0377400 A1 12/2015 Rosenthal
2016/0016109 A1 1/2016 Strandberg

FOREIGN PATENT DOCUMENTS

| JP | 2005 337 434 A | * 12/2005 | ............ F16L 41/021 |
| KR | 101757914 B1 | 7/2017 | |
| WO | WO-2014/122051 A1 | 8/2014 | |
| WO | WO-2017/203837 A1 | 11/2017 | |

OTHER PUBLICATIONS

Extended European Search Report for European Patent Application No. 20207155.1, dated Feb. 8, 2021, (8 pages), European Patent Office, Munich, Germany.

* cited by examiner

SCRUBBER FOR EXHAUST GAS CLEANING

CROSS REFERENCE TO RELATED APPLICATIONS

This application claims priority to Finland Patent Application No. 20196116, filed on Dec. 20, 2019, the contents of which as are hereby incorporated by reference in its entirety.

BACKGROUND

Related Field

The present solution relates to a scrubber for exhaust gas cleaning onboard a marine vessel.

The present solution relates to a marine vessel including a scrubber for exhaust gas cleaning onboard the marine vessel.

The present solution relates to a collar flange for attaching a tubular pipe to an exhaust gas cleaning scrubber.

Description of Related Art

Exhaust gas from a marine vessel is released into the atmosphere with post combustion treatment to reduce the emission of environmental deleterious constituents. Of special interest is emission of sulphur oxides (SOx) and particles formed by the combustion and emitted into the atmosphere in the exhaust gas of a combustion engine of the marine vessel. SOx is a result of combustion of sulphur containing compounds.

A device for the post combustion treatment of the exhaust gas is a scrubber for cleaning exhaust gas. The scrubber removes or neutralizes sulphur oxide components from the exhaust gas, especially sulphur oxide. A scrubber of the wet scrubber, or water scrubber, type uses a liquid, i.e. a scrubber liquid, which is sprayed into the hot exhaust gas flow inside a chamber of the scrubber. The liquid may be sea water or fresh water, for example. To remove sulphur oxide from the exhaust gas, the method applied in the scrubber includes reacting the exhaust gas with the scrubber liquid to form alkali sulfites.

The scrubber is enveloped by a shell forming the scrubber chamber inside the shell. Pipes feeding scrubber liquid into the chamber run through the shell in such a way that the pipe and the shell are connected to each other by welding to form a tight joint around the pipe. Inside the chamber, nozzles may be connected to the pipe to spray the scrubber liquid.

The shell and the pipes are heated by hot exhaust gases conveyed into the scrubber chamber and thus, the shell and the pipe expand. When scrubber liquid is led via the pipe, the scrubber liquid cools the pipe and the thermal expansion of the pipe decreases. A difference in the thermal expansion of the pipe and the shell may bring about stresses that can cause weakening of the material of the shell, the pipe, or the welded joint around the pipe, i.e. metal fatigue, and may result in structural damage.

A decrease in the generated stresses would provide prolonged service life of the pipe and/or the welded joint. Thus, savings in replacing the pipe or in the repair or maintenance of the welded joint would be achieved.

BRIEF SUMMARY

The solution to be presented relates to overcoming one or more of the disadvantages noted above.

An object of the presented solution is to provide a solution that provides a decrease in the generated stresses of the scrubber and a longer service life.

The scrubber according to the presented solution comprises a scrubber shell forming a scrubber chamber, at least one tubular pipe running through the scrubber shell for feeding scrubber liquid into the scrubber chamber, and a concave bowl for connecting the tubular pipe to the scrubber shell, the concave bowl having the shape of a solid of revolution, curving smoothly from the rim of the concave bowl to the bottom of the concave bowl.

In the presented solution, the tubular pipe runs through the bottom of the concave bowl in such a way that the bottom encircles the tubular pipe, and the tubular pipe and the bottom are connected to each other, and the concave bowl is placed in an opening in the scrubber shell in such a way that the scrubber shell encircles the rim of the concave bowl, and the scrubber shell and the rim are connected to each other.

According to an example, the concave bowl comprises an inside surface facing the outside of the scrubber and an outside surface facing the inside of the scrubber. The bottom is spaced from the rim.

According to an example, next to the rim and at the bottom, the diameter of the concave bowl continuously decreases in the direction from the rim to the bottom.

The marine vessel according to the presented solution comprises the above-mentioned scrubber, a combustion engine for propelling the marine vessel, a conduit system for conveying exhaust gas from the combustion engine to the scrubber and from the scrubber into the atmosphere; and a system for supplying scrubber liquid to the scrubber.

The collar flange for connecting a tubular pipe to an exhaust gas cleaning scrubber according to the presented solution comprises a concave bowl for connecting a tubular pipe to a shell of a scrubber, the concave bowl taking the shape of a solid of revolution, curving smoothly from the rim of the concave bowl to the bottom of the concave bowl.

At the bottom, the concave bowl comprises an opening suitable for connecting the bottom to the tubular pipe that is encircled by the bottom, and the concave bowl is suitable for being placed in an opening in the shell of the scrubber, and the rim is suitable to be connected to the shell that encircles the rim.

An advantage provided by the presented solution is that the service life of the concave bowl or the collar flange can be extended, or it even matches the service life of the scrubber to which the concave bowl or the collar flange is attached.

In the presented solution, a decrease in the generated stresses is provided by the shape of the concave bowl which smooths out any differences in the thermal expansion at the rim and at the bottom of the concave bowl, which differences are caused, on one hand, by the tubular pipe connected to the bottom and, on the other hand, by the shell of the scrubber connected to the rim.

The shape of the concave bowl that curves smoothly, e.g. in a continuous manner without discontinuities or abrupt changes, prevents occurrences of stress concentrations.

The concave bowl constitutes a flexible element that allows the thermal expansion of the tubular pipe in relation to the shell when the tubular pipe cools down.

Preferably, the bottom and the rim are connected to the tubular pipe and the shell by means of welded joints.

DETAILED DESCRIPTION OF VARIOUS EMBODIMENTS

Reference will now be made to the examples which are illustrated in the accompanying drawings. Wherever possible, the same or corresponding reference numbers will be used throughout the drawings to refer to the same or corresponding parts or features.

Figure 1:
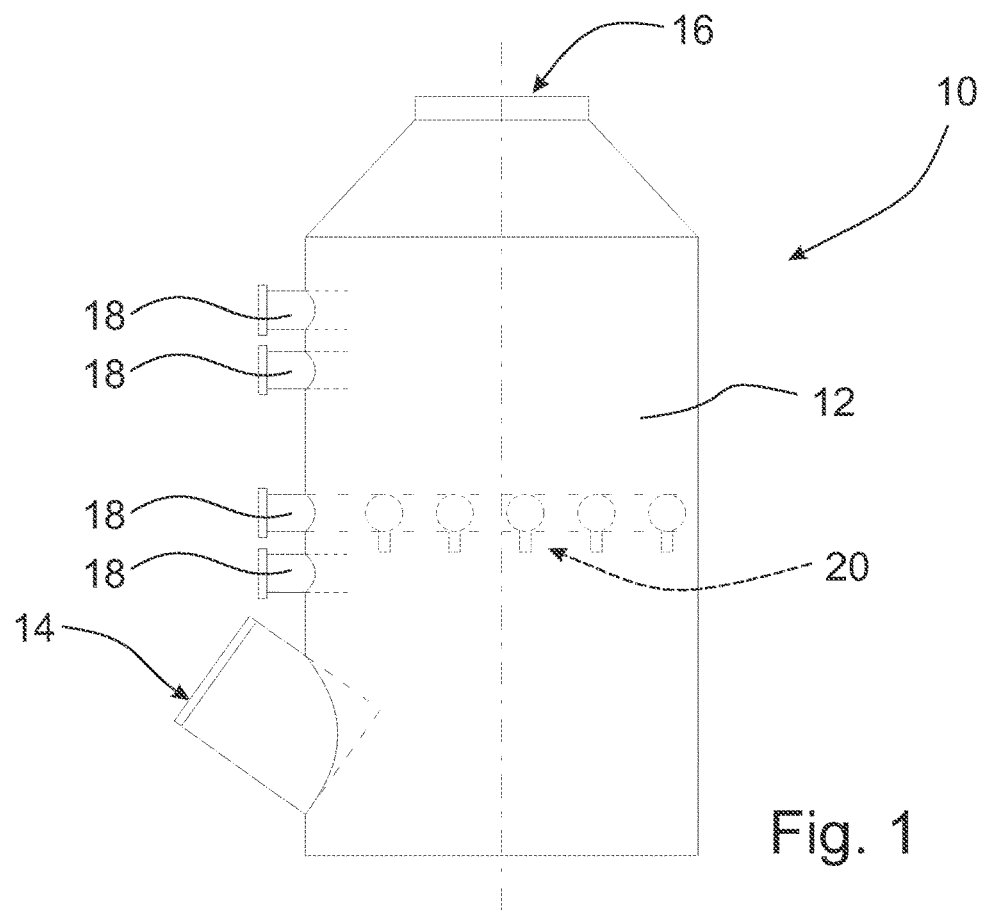
FIG. 1 shows a simplified example of a scrubber for exhaust gas cleaning onboard a marine vessel, in which scrubber the presented solution can be applied.

In the text, reference will be made to the figures with the following numerals:
10 Scrubber
12 Scrubber shell
14 Exhaust gas inlet
16 Exhaust gas outlet
18 Tubular pipe
20 Nozzle
22 Marine vessel
24 Combustion engine
26 Conduit system
28 Supply system
30 Hull
32 Concave bowl
34 Opening
36 Opening
38 Outside surface
40 Inside surface
42 Welded joint
44 Welded joint
46 Rim
48 Bottom
50 Outside
52 Inside FIG. 1 shows a scrubber in which the presented solution can be applied.

The scrubber 10 shown in FIG. 1 is especially for exhaust gas cleaning onboard a marine vessel.

Preferably, the scrubber 10 is a welded steel structure.

The scrubber 10 comprises a scrubber shell 12 forming a scrubber chamber inside the scrubber shell 12.

Preferably, the scrubber 10 may further comprise an exhaust gas inlet 14 for conveying exhaust gas into the scrubber chamber and an exhaust gas outlet 16 for conveying exhaust gas out of the scrubber chamber.

The scrubber 10 may be circular in cross section e.g. in a horizontal imaginary plane. The scrubber 10 may extend vertically, the exhaust gas inlet 14 may be located at the lower part of the scrubber shell 12 and the exhaust gas outlet 16 may be located at the upper part of the scrubber shell 12.

The scrubber 10 comprises at least one tubular pipe 18 running through the scrubber shell 12 for feeding scrubber liquid into the scrubber chamber. There may be several tubular pipes 18 located at different heights.

According to the example in FIG. 1, outside the scrubber shell 12 the pipe 18 may have a collar-like flange for attaching a line supplying scrubber liquid into the pipe 18. The collar-like flange may form an end of the pipe 18.

Inside the scrubber shell 12 the pipe 18 may have several nozzles 20 attached to it for spraying scrubber liquid. The scrubber liquid may be sea water or fresh water, for example. The scrubber liquid is sprayed into the hot exhaust gas flow that passes the pipe 18 inside the scrubber chamber.

The scrubber liquid flowing inside the pipe 18 cools down the pipe 18 and the sprayed scrubber liquid cools down the exhaust gas. Thus, the pipe(s) 18 near or nearest to the exhaust gas inlet 14 may experience thermal expansion which significantly differs from the thermal expansion experienced by the scrubber shell 12 around the pipe 18 because the scrubber shell 12 is heated up by the incoming hot exhaust gas.

In the present solution only one or only some of the pipes 18 of the scrubber 10, e.g. at the lower part of the scrubber shell 12, may be connected to the scrubber shell 12 as described in this specification. Other pipes 18 of the scrubber 10, e.g. at the upper part of the scrubber shell 12, may be connected to the scrubber shell 12 in a conventional way.

Figure 3:
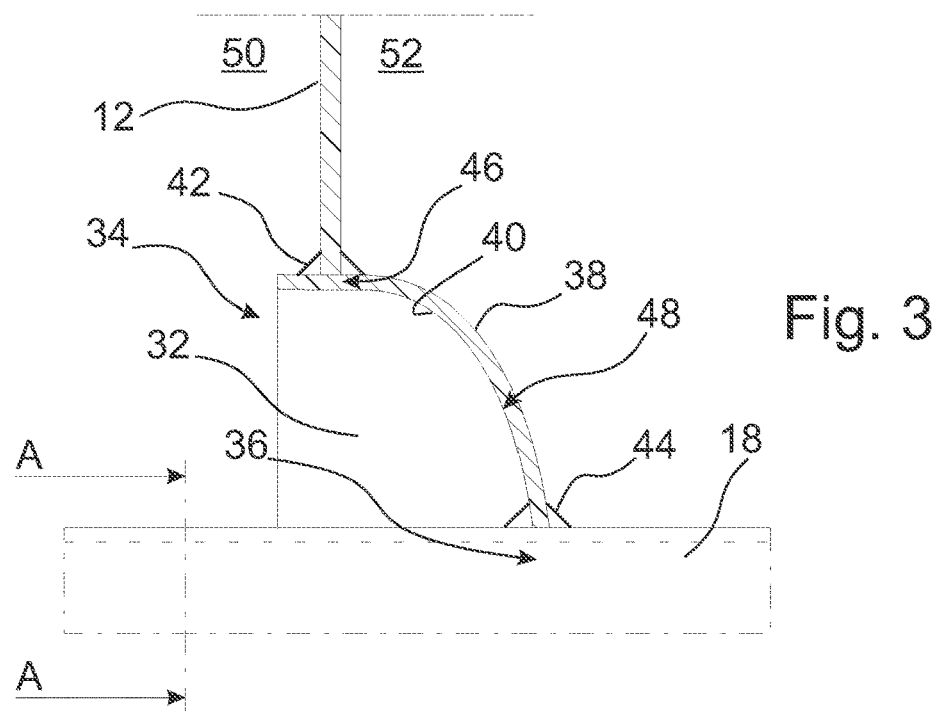
FIG. 3 shows an example of the concave bowl and the collar flange according to the present solution seen from a side.
Figure 4:
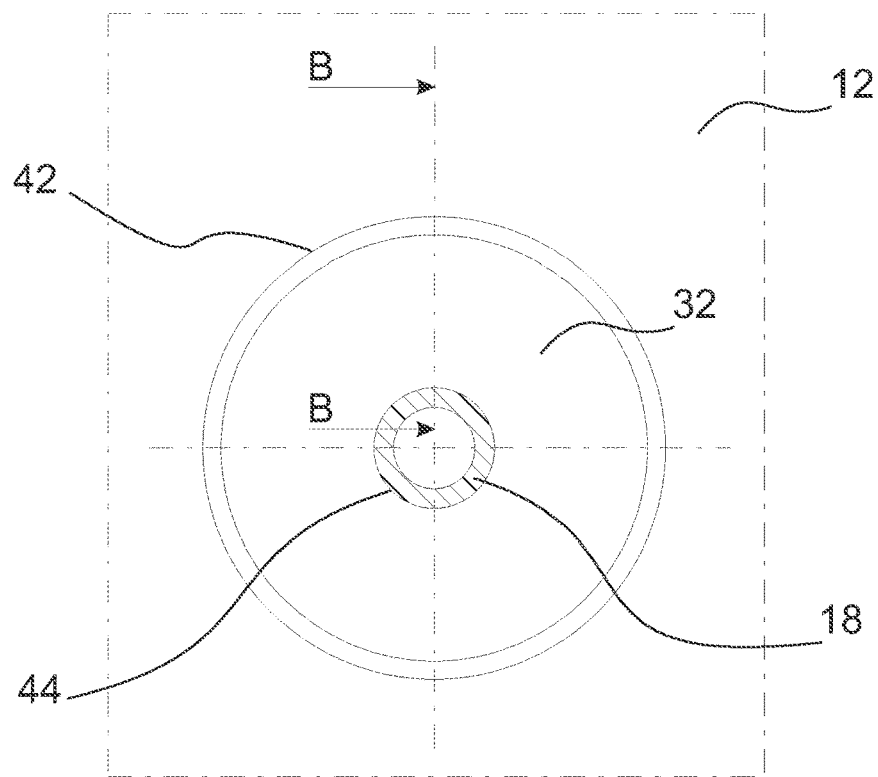
FIG. 4 shows the concave bowl and the collar flange of FIG. 3 seen from the front side.

As shown in FIGS. 3 and 4, according to the present solution, the scrubber 10 comprises at least one concave bowl 32 for connecting the tubular pipe 18 to the scrubber shell 12.

The concave bowl 32 may constitute a collar flange by means of which the tubular pipe 18 is connected to the scrubber shell 12.

Preferably, at the concave bowl 32, the pipe 18 has a circular cross section and/or the shape of a solid of revolution.

In the present solution, the concave bowl 32 has the shape of a solid of revolution. The shape of the concave bowl 32 curves smoothly from the rim 46 of the concave bowl 32, or from a point immediately adjacent to or in the vicinity of the rim 46, to the bottom 48 of the concave bowl 32.

More specifically, the solid of revolution is a solid figure obtained by rotating a curve, situated in a plane, around a straight line representing the axis of revolution, the straight line lying on the same plane.

The concave bowl 32 may be manufactured e.g. by hot forming, cold forming, deep drawing, or spin forming.

Preferably, according to an example, the shape of the concave bowl 32 curves smoothly in such a way that the concave bowl 32 is continuous from the rim 46 to the bottom 48 and without discontinuities or abrupt changes being present on the surface of the concave bowl 32.

As shown in FIG. 3, according to an example the shape of the concave bowl 32 is such that, next to the rim 46 and at the bottom 48, the diameter of the concave bowl 32 continuously decreases in a direction from the rim 46 to the bottom 48. The direction is parallel with the above-mentioned axis of revolution and/or substantially perpendicular to the scrubber shell 12. When installed in place according to the example, as shown in FIG. 3, the diameter of the concave bowl 32 continuously decreases in a direction from the outside of the scrubber 10 to the inside of the scrubber 10.

Additionally, as shown in FIG. 3, according to an example, the shape of the concave bowl 32 is such that, at the rim 46, the diameter of the concave bowl 32 is substantially constant, or continuously decreases in the above-mentioned directions.

Preferably, the rim 46 is an integral part of the concave bowl 32 and the bottom 48. Thus, the rim 46 and the bottom 48 may be formed from the same blank of material.

According to another example, the rim 46 is a circular flange, e.g. a ring-like or a hoop-like structure, connected to the rest of the structure of the concave bowl 32 or to the bottom 48. The rim 46 is connected to the bottom 48 preferably by welding. There may be discontinuities or abrupt changes present on the surface of the concave bowl 32 at the location where the rim 46 is attached to the rest of the concave bowl 32. Preferably, any such discontinuities or abrupt changes are smoothed out during the manufacture of the concave bowl 32.

The concave bowl 32 is connected to the pipe 18 in such a way that the pipe 18 runs through the bottom 48 of the concave bowl 32. The bottom 48 encircles 48 the pipe 18. The pipe 18 and the bottom 48 are preferably connected to each other by welding, see the welded joint 44 in FIG. 3.

Preferably, the longitudinal direction of the pipe 18 is parallel with the above-mentioned axis of revolution and/or is substantially perpendicular to the scrubber shell 12.

The concave bowl 32 is connected to the scrubber 10 in such a way that the concave bowl 32 is placed in an opening 34 in the scrubber shell 12. The scrubber shell 12 encircles the rim 46 of the concave bowl 32. The scrubber shell 12 and the rim 46 are connected to each other preferably by welding, see the welded joint 42 in FIG. 3.

According to an example, the concave bowl 32 comprises an inside surface 40 and an outside surface 38.

According to an example, the inside surface 40 is oriented to the outside 50 of the scrubber 10, and the outside surface 38 is oriented to the inside 52 of the scrubber 10. Thus, the concave bowl 32 stands out as an indentation in the scrubber shell 12 when seen from the outside of the scrubber 10. This arrangement brings the benefit that there are no indentations inside the scrubber shell 12 that are difficult to wash by means of the sprayed scrubber liquid. Thus, the risk of corrosion is reduced.

According to an example of FIG. 3, when installed in the opening 34 in the scrubber shell 12, the bottom 48 of the concave bowl 32 is placed at a distance L from the rim 46 of the concave bowl 32 in a direction from the outside of the scrubber 10 to the inside of the scrubber 10. Preferably, the direction is parallel with the longitudinal direction of the tubular pipe 18.

In the following examples, some of the shapes of the concave bowl 32 according to the presented solution as described above will be explained in more detail.

Figure 5:
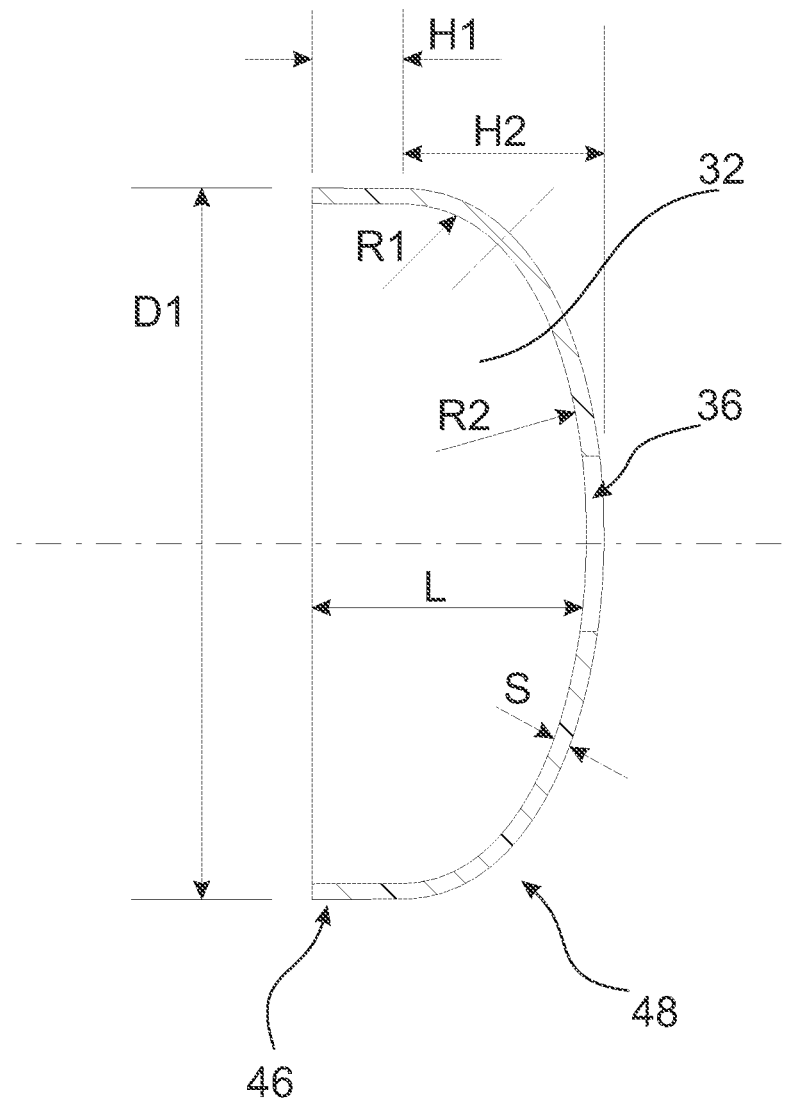
FIG. 5 shows the concave bowl and the collar flange of FIG. 3 seen from a side.

When manufacturing the concave bowl 32, the shape of the inside surface 40 of the concave bowl 32 may follow two radii of curvature R1, R2 as shown in FIG. 5. Additionally, the concave bowl 32 exhibits an outer diameter D1 representing the outer maximum diameter of the concave bowl 32 and the rim 46. The heights H1, H2 of the concave bowl 32, the rim 46 and the bottom 48 are determined in a direction parallel with the above-mentioned axis of revolution. The outer diameter D1 of the concave bowl 32 and the rim 46 is determined in a direction perpendicular to the above-mentioned axis of revolution.

According to an example, the radius of curvature R1 next to the rim 46 is shorter than the radius of curvature R2 at the bottom 48. The rim 46 has the shape of a circular flange having a substantially constant diameter D1, i.e. R1<R2. Additionally, the radius of curvature R2 at the bottom 48 may be substantially equal or shorter than the outer diameter D1, i.e. R2=D1, or R2<D1.

According to another example, the radius of curvature R1 at the rim 46 and at the bottom 4 is substantially 0.5 times the outer diameter D1 of the rim 46, i.e. R1=0.5×D1.

According to a third example, the radius of curvature R1 next to the rim 46 is substantially 0.1 times the outer diameter D1 of the rim 46, and the radius of curvature R2 at the bottom 48 is substantially equal to the outer diameter D1 of the rim 46, i.e. R1=0.1×D1, and R2=D1. Additionally, the rim 46 has the shape of a circular flange having a constant diameter that is substantially equal to the outer diameter D1 of the rim 46. Additionally, as shown in FIG. 5, the height H2 of the concave bowl 32, excluding the height H1 of the rim 46, is substantially 0.1935 times the outer diameter D1 of the rim 46 minus 0.455 times the thickness S of the concave bowl 32, i.e. H2=0.1935×D1−0.455×S, or less.

According to a fourth example, the radius of curvature R1 next to the rim 46 is substantially 0.154 times the outer diameter D1 of the rim 46, and the radius of curvature R2 at the bottom 48 is substantially 0.8 times the outer diameter D1 of the rim 46, i.e. R1=0.154×D1, and R2=0.8×D1. Additionally, the rim 46 has the shape of a circular flange having a constant diameter that is substantially equal to the outer diameter D1 of the rim 46. Additionally, as shown in FIG. 5, the height H2 of the concave bowl 32, excluding the height H1 of the rim 46, is substantially 0.255 times the outer diameter D1 of the rim 46 minus about 0.635 times the thickness S of the concave bowl 32, i.e. H2=0.255×D1−0.635×S, or less.

According to a fifth example, the radius of curvature R1 next to the rim 46 is substantially 0.08 times the outer diameter D1 of the rim 46, and the radius of curvature R2 at the bottom 48 is substantially 0.875 times the outer diameter D1 of the rim 46, i.e. R1=0.08×D1, and R2=0.875×D1. Additionally, the rim 46 has the shape of a circular flange having a constant diameter that is substantially equal to the outer diameter D1 of the rim 46. Additionally, as shown in FIG. 5, the height H2 of the concave bowl 32, excluding the height H1 of the rim 46, is substantially 0.2 times the outer diameter D1 of the rim 32, i.e. H2=0.2×D1, or less.

According to a sixth example, 12 the radius of curvature R1 next to the rim 46 is substantially 0.05 times the outer diameter D1 of the rim 46, and the radius of curvature R2 at the bottom 48 is substantially equal to the outer diameter D1 of the rim 46, i.e. R1=0.05×D1, and R2=D1. Additionally, the rim 46 has the shape of a circular flange having a constant diameter that is substantially equal to the outer diameter D1 of the rim 32. Additionally, as shown in FIG. 5, the height H2 of the concave bowl 32, excluding the height H1 of the rim 46, is substantially 0.16 times the outer diameter D1 of the rim 46, i.e. H2=0.16×D1, or less.

According to a seventh example, the radius of curvature R1 next to the rim 46 is 30 to 50 mm or substantially 0.033 times the outer diameter D1 of the rim 46, and the radius of curvature R2 at the bottom 48 is substantially equal to the outer diameter D1 of the rim 32, i.e. R1=0.033×D1, and R2=D1. Additionally, the rim 46 has the shape of a circular flange having a constant diameter that is substantially equal to the outer diameter D1 of the rim 46.

Figure 2:
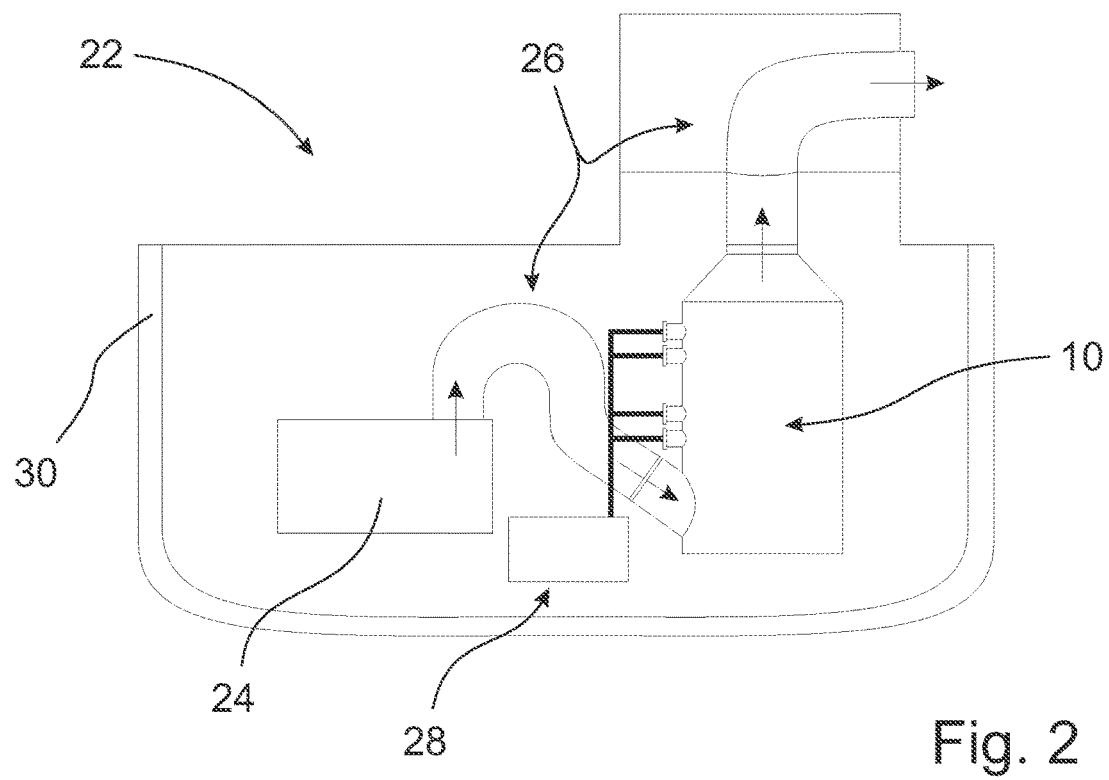
FIG. 2 shows a simplified example of a marine vessel in which the scrubber of FIG. 1 can be applied.

FIG. 2 shows, in a reduced view, a marine vessel 22 in which the scrubber 10 according to the present solution can be applied in a manner as described above in the examples.

The marine vessel 22 may be e.g. a cruise ship, a container ship, or a cargo ship.

The scrubber 10 for exhaust gas cleaning is onboard the marine vessel inside the hull 30 of the marine vessel 22. The marine vessel 22 further comprises a combustion engine 24 for propelling the marine vessel 22, e.g. by means of a propeller adapted to force the marine vessel 22 to move forward. The marine vessel 22 further comprises a conduit system 26 for conveying exhaust gas from the combustion engine 24 to the scrubber 10 and from the scrubber 10 into the atmosphere, and a supply system 28 for supplying scrubber liquid to the scrubber 10. The conduit system 26 is connected to the exhaust gas inlet 14 and the exhaust gas outlet 16 of the scrubber.

The term "substantially", in relation to dimensioning, takes tolerances in manufacturing into account. In the examples of the presented solution, the dimensions may vary within acceptable tolerances taking the manufacturing process and the method of measurement into account.

The verbs "to comprise" and "to include" are used in this document as open limitations that neither exclude nor require the existence of features that are not cited. Furthermore, it is to be understood that the use of "a" or "an", i.e. a singular form, throughout this document does not exclude a plurality, unless where specifically mentioned.

In the description, numerous specific details are set forth in order to provide a thorough understanding of the presented solution. It is to be understood that the examples of the solution disclosed are not limited to the structures disclosed herein. The presented solution is not limited solely to the above-presented embodiments, but it can be modified within the scope of the appended claims.

The invention claimed is:

1. A scrubber for exhaust gas cleaning onboard a marine vessel, comprising:
   a scrubber shell forming a scrubber chamber;
   a tubular pipe running through the scrubber shell for feeding scrubber liquid into the scrubber chamber; and
   a concave bowl for connecting the tubular pipe to the scrubber shell, the concave bowl having the shape of a solid of revolution, and the shape curving smoothly from the rim of the concave bowl to the bottom of the concave bowl,
   wherein:
      the tubular pipe runs through the bottom of the concave bowl in such a way that the bottom encircles the tubular pipe, and the tubular pipe and the bottom are connected to each other, and
      the concave bowl is placed in an opening in the scrubber shell in such a way that the scrubber shell encircles the rim of the concave bowl, and the scrubber shell and the rim are connected to each other.

2. The scrubber according to claim 1, wherein the concave bowl comprises an inside surface oriented to the outside of the scrubber and an outside surface oriented to the inside of the scrubber in such a way that the bottom is placed at a distance from the rim in the direction from the outside of the scrubber to the inside of the scrubber.

3. The scrubber according to claim 1, wherein, next to the rim and at the bottom, the diameter of the concave bowl continuously decreases in the direction from the rim to the bottom.

4. The scrubber according to claim 3, wherein, at the rim, the diameter of the concave bowl is substantially constant or decreases continuously in the direction from the rim to the bottom.

5. The scrubber according to claim 1, wherein:
   the radius of curvature of the concave bowl next to the rim is shorter than the radius of curvature of the concave bowl at the bottom, and
   the rim has the shape of a circular flange having a substantially constant diameter.

6. The scrubber according to claim 5, wherein the radius of curvature at the bottom is substantially equal to or shorter than the outer diameter of the rim.

7. The scrubber according to claim 1, wherein the radius of curvature at the rim and at the bottom is substantially 0.5 times the outer diameter of the rim.

8. The scrubber according to claim 1, wherein:
   the radius of curvature next to the rim is substantially 0.1 times the outer diameter of the rim, and the radius of curvature at the bottom is substantially equal to the outer diameter of the rim,
   the rim has the shape of a circular flange having a substantially constant diameter that is equal to the outer diameter of the rim, and
   the height of the concave bowl, excluding the height of the rim, is substantially 0.1935 times the outer diameter of the rim minus 0.455 times the thickness of the concave bowl, or smaller.

9. The scrubber according to claim 1, wherein:
   the radius of curvature next to the rim is substantially 0.154 times the outer diameter of the rim, and the radius of curvature at the bottom is substantially 0.8 times the outer diameter of the rim,
   the rim has the shape of a circular flange having a substantially constant diameter that is substantially equal to the outer diameter of the rim, and
   the height of the concave bowl, excluding the height of the rim, is substantially 0.255 times the outer diameter of the rim minus about 0.635 times the thickness of the concave bowl, or smaller.

10. The scrubber according to claim 1, wherein:
    the radius of curvature next to the rim is substantially 0.08 times the outer diameter of the rim and the radius of curvature at the bottom is substantially 0.875 times the outer diameter of the rim,
    the rim has the shape of a circular flange having a substantially constant diameter that is substantially equal to the outer diameter of the rim, and
    the height of the concave bowl, excluding the height of the rim, is substantially 0.2 times the outer diameter of the rim, or smaller.

11. The scrubber according to claim 1, wherein:
    the radius of curvature next to the rim is substantially 0.05 times the outer diameter of the rim and the radius of curvature at the bottom is substantially equal to the outer diameter of the rim,
    the rim has the shape of a circular flange having a substantially constant diameter that is substantially equal to the outer diameter of the rim, and
    the height of the concave bowl, excluding the height of the rim, is substantially 0.16 times the outer diameter of the rim, or smaller.

12. The scrubber according to claim 1, wherein:
    the radius of curvature next to the rim is 30 to 50 mm or substantially 0.033 times the outer diameter of the rim and the radius of curvature at the bottom is substantially equal to the outer diameter of the rim, and
    the rim has the shape of a circular flange having a substantially constant diameter that is substantially equal to the outer diameter of the rim.

13. The scrubber according to claim 1, wherein the scrubber further comprises:
    an exhaust gas inlet for conveying exhaust gas into the scrubber chamber;
    an exhaust gas outlet for conveying exhaust gas out of the scrubber chamber; and
    nozzles for spraying scrubber liquid, the nozzles being connected to the tubular pipe inside the scrubber chamber.

14. The scrubber according to claim 1, wherein:
the tubular pipe and the bottom are connected to each other by a welded joint; and
the scrubber shell and the rim are connected to each other by a welded joint.

15. The scrubber according to claim 1, wherein:
the tubular pipe and the bottom are connected to each other by a welded joint;
the scrubber shell and the rim are connected to each other by a welded joint; and
the scrubber further comprises:
  an exhaust gas inlet for conveying exhaust gas into the scrubber chamber;
  an exhaust gas outlet for conveying exhaust gas out of the scrubber chamber; and
  nozzles for spraying scrubber liquid, the nozzles being connected to the tubular pipe inside the scrubber chamber.

16. The scrubber according to claim 1, wherein:
the tubular pipe and the bottom are connected to each other by a welded joint;
the scrubber shell and the rim are connected to each other by a welded joint; and
the concave bowl comprises an inside surface oriented to the outside of the scrubber and an outside surface oriented to the inside of the scrubber in such a way that the concave bowl stands out as an indentation in the scrubber shell when seen from the outside of the scrubber.

17. The scrubber according to claim 1, wherein:
the tubular pipe and the bottom are connected to each other by a welded joint;
the scrubber shell and the rim are connected to each other by a welded joint;
the concave bowl comprises an inside surface oriented to the outside of the scrubber and an outside surface oriented to the inside of the scrubber in such a way that the concave bowl stands out as an indentation in the scrubber shell when seen from the outside of the scrubber; and
the scrubber further comprises:
  an exhaust gas inlet for conveying exhaust gas into the scrubber chamber;
  an exhaust gas outlet for conveying exhaust gas out of the scrubber chamber; and
  nozzles for spraying scrubber liquid, the nozzles being connected to the tubular pipe inside the scrubber chamber.

18. A marine vessel, comprising:
a scrubber for exhaust gas cleaning onboard the marine vessel, comprising:
  a scrubber shell forming a scrubber chamber;
  a tubular pipe running through the scrubber shell for feeding scrubber liquid into the scrubber chamber;
  a concave bowl for connecting the tubular pipe to the scrubber shell, the concave bowl having the shape of a solid of revolution, and the shape curving smoothly from the rim of the concave bowl to the bottom of the concave bowl,
  wherein
    the tubular pipe runs through the bottom of the concave bowl in such a way that the bottom encircles the tubular pipe, and the tubular pipe and the bottom are connected to each other, and
    the concave bowl is placed in an opening in the scrubber shell in such a way that the scrubber shell encircles the rim of the concave bowl, and the scrubber shell and the rim are connected to each other;
a combustion engine for propelling the marine vessel;
a conduit system for conveying exhaust gas from the combustion engine to the scrubber and from the scrubber into the atmosphere; and
a supply system for delivering scrubber liquid to the scrubber.

19. The marine vessel according to claim 18, wherein:
the tubular pipe and the bottom are connected to each other by a welded joint;
the scrubber shell and the rim are connected to each other by a welded joint;
the scrubber further comprises:
  an exhaust gas inlet for conveying exhaust gas into the scrubber chamber;
  an exhaust gas outlet for conveying exhaust gas out of the scrubber chamber; and
  nozzles for spraying scrubber liquid, the nozzles being connected to the tubular pipe inside the scrubber chamber.

20. The marine vessel according to claim 18, wherein:
the tubular pipe and the bottom are connected to each other by a welded joint;
the scrubber shell and the rim are connected to each other by a welded joint;
the concave bowl comprises an inside surface oriented to the outside of the scrubber and an outside surface oriented to the inside of the scrubber in such a way that the concave bowl stands out as an indentation in the scrubber shell when seen from the outside of the scrubber; and
the scrubber further comprises:
  an exhaust gas inlet for conveying exhaust gas into the scrubber chamber;
  an exhaust gas outlet for conveying exhaust gas out of the scrubber chamber; and
  nozzles for spraying scrubber liquid, the nozzles being connected to the tubular pipe inside the scrubber chamber.

* * * * *